United States Patent [19]
Thomas

[11] Patent Number: 5,275,017
[45] Date of Patent: Jan. 4, 1994

[54] CONDENSER APPARATUS

[75] Inventor: Vernon L. Thomas, Bedford, Tex.

[73] Assignee: Clardy Manufacturing, Inc., Bedford, Tex.

[21] Appl. No.: 918,461

[22] Filed: Jul. 22, 1992

[51] Int. Cl.[5] .............................................. F25B 39/04
[52] U.S. Cl. ......................................... 62/428; 62/507; 165/122
[58] Field of Search ........................ 62/244, 428, 507; 165/122

[56] References Cited

U.S. PATENT DOCUMENTS

| | | | |
|---|---|---|---|
| 2,922,293 | 1/1960 | Peix | 62/507 X |
| 3,381,493 | 5/1968 | Dixon | 62/244 |
| 3,426,549 | 2/1969 | Bardong | 62/244 |
| 3,449,924 | 6/1969 | Sudmeier | 62/244 X |
| 3,524,328 | 8/1970 | Schuster | 165/122 X |
| 3,595,029 | 7/1971 | Lende, Jr. | 62/244 |
| 3,628,349 | 12/1971 | Dixon | 62/244 X |
| 3,630,044 | 12/1971 | Dixon | 62/244 X |
| 3,712,077 | 1/1973 | Dixon | 62/244 X |
| 3,817,054 | 6/1974 | Adams | 62/244 X |
| 3,918,270 | 11/1975 | Dixon et al. | 62/244 X |

Primary Examiner—William E. Tapolcai
Attorney, Agent, or Firm—Arthur F. Zobal

[57] ABSTRACT

The condenser apparatus is enclosed in a container. The container is adapted to be located in a rear engine automobile behind the rear sear adjacent to the firewall. Within the container is a condenser coil and a motor for rotating a blower. The condenser coil is adapted to be coupled to the automobile air conditioner coolant system by refrigerant inlet and outlet conduits. The motor is adapted to be electrically connected to the automobile air conditioning system. The motor and blower provides a source of continuous air flow to cool the condenser coil, reducing the likelihood of overheating the air conditioning system. An air intake extension may be coupled with the container to allow air from a car vent to flow into the container.

11 Claims, 6 Drawing Sheets

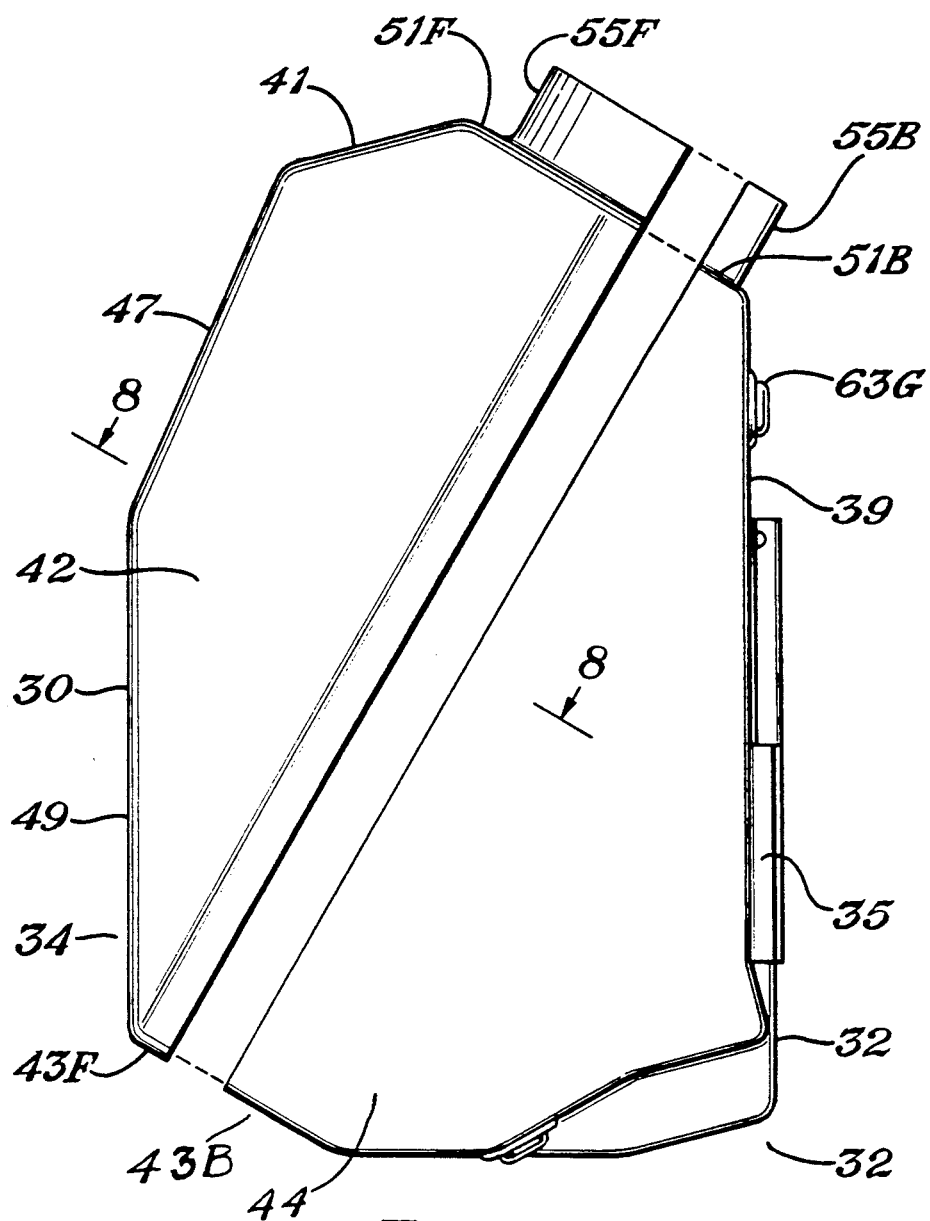
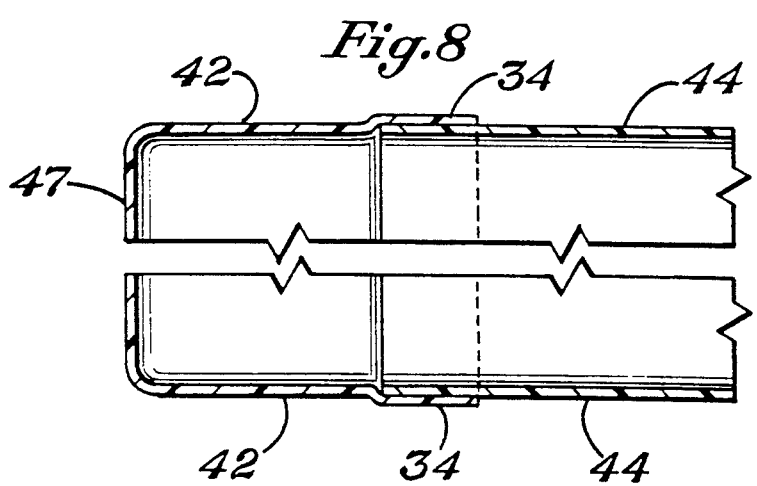

CONDENSER APPARATUS

FIELD OF THE INVENTION

The present invention relates to an automobile air conditioner apparatus, and in particular, a condenser apparatus for a rear-engine automobile.

BACKGROUND OF THE INVENTION

Automobile air conditioning systems are used to cool the interior of autos for passenger comfort when outdoor temperatures are high. Automobile air conditioning systems operate by the exchange of heat between a refrigerant, air outside the automobile, and air inside the automobile. The passenger compartment air is cooled by transfer of heat between the compartment air and liquid refrigerant, cooling the air and heating and evaporating the refrigerant. The cooled air is blown into the automobile's passenger compartment by a fan. Heated refrigerant is cooled by transfer of heat between the gaseous refrigerant and air outside the automobile. The gaseous refrigerant is pressurized, then cooled by passing outside air over the refrigerant, thereby condensing the refrigerant and heating the outside air.

Evaporation and condensation of the refrigerant occur in evaporator and condenser coils, respectively. Refrigerant passes through the coils while air passes over and around the coils promoting effective heat exchange. Gaseous heated refrigerant created by heat exchange in the evaporator coil is transferred to the condenser coil for condensation and cooling. The cooled liquid refrigerant in turn, is cycled back into the evaporator coil where the refrigerant is evaporated and heated by cooling the automobile's passenger compartment air.

In typical front engine automobiles the condenser coil is located under the front hood of the car and is exposed to a continuous flow of air from a fan which cools the refrigerant in the condenser coil. However, in some rear engine automobiles, the Volkswagen Beetle in particular, the condenser coil is located beneath the engine, and has no continuous air flow source. When these rear engine automobiles are in motion the condenser receives a flow of air to cool and condense the air conditioner refrigerant. However, when the automobile is stopped, no air flow reaches the condenser, and the refrigerant is not cooled. If the air conditioner is on and the automobile is stopped for a period of time, or if the automobile is subject to frequent stops, the engine overheats and stalls because the air conditioning system overheats from lack of cooling air flow.

SUMMARY OF THE INVENTION

It is therefore an object of the present invention to provide a condenser apparatus for rear engine automobiles that has a condenser coil with a continuous air flow source, where the continuous air flow source cools the condenser coil thus reducing the likelihood that the air conditioning system will overheat the automobile engine.

The condenser apparatus of the present invention includes front and back shells which are coupled together to form a condenser container having a top wall, bottom wall, front wall, back wall and two side walls, where the walls form a cavity between them. A condenser coil and a blower driven by an electric motor are located within the cavity, the condenser coil being capable of condensing an air conditioner refrigerant and the blower providing a continuous flow of air to cool the condenser coil. The condenser container has several openings extending through the walls into the cavity; an air inlet opening for allowing air into the container; an air outlet opening for allowing the blower to blow air out of the container; and a refrigerant inlet opening and a refrigerant outlet opening for allowing refrigerant inlet and outlet conduits to extend into and out of the container. The condenser apparatus is adapted to fit into a rear engine automobile, in particular a Volkswagen Beetle, and be coupled to the automobile's air conditioning system.

An air intake extension may be coupled to the condenser container in order to extend between the container and a car vent so that air from outside the automobile may be drawn into the container. A connecting end of the air intake extension couples the back wall of the container over the air intake opening. An extension cavity is formed between an upper wall, lower wall, side walls and an end wall of the air intake extension. A vent access opening extends through the lower wall near the end wall of the air intake extension so that air may flow through the vent access opening into the extension cavity, and from the extension cavity through the air intake opening of the container into the container. The air intake extension is adapted to be located in a rear engine automobile, particularly a Volkswagen Beetle, so that the vent access opening is positioned near a car vent when the air intake extension is coupled to the condenser container and the container is located in the automobile. The condenser container and the air intake extension may be secured to the automobile by mounting brackets.

BRIEF DESCRIPTION OF THE DRAWINGS

In FIG. 2, a portion of the front wall of the container and a portion of the front wall of the air intake extension are removed to illustrate the inside components.

FIG. 7 is an exploded view of the two shells of the container of the condenser apparatus.

FIG. 8 is a partial cross-section of the container as seen from lines 8—8 of FIG. 7 when the two shells are assembled together to form the container. In FIG. 8, the condenser coil, blower and motor are not shown in the container to allow a better view of the joint between the two shells that form the container.

DESCRIPTION OF THE PREFERRED EMBODIMENT

Figure 1:
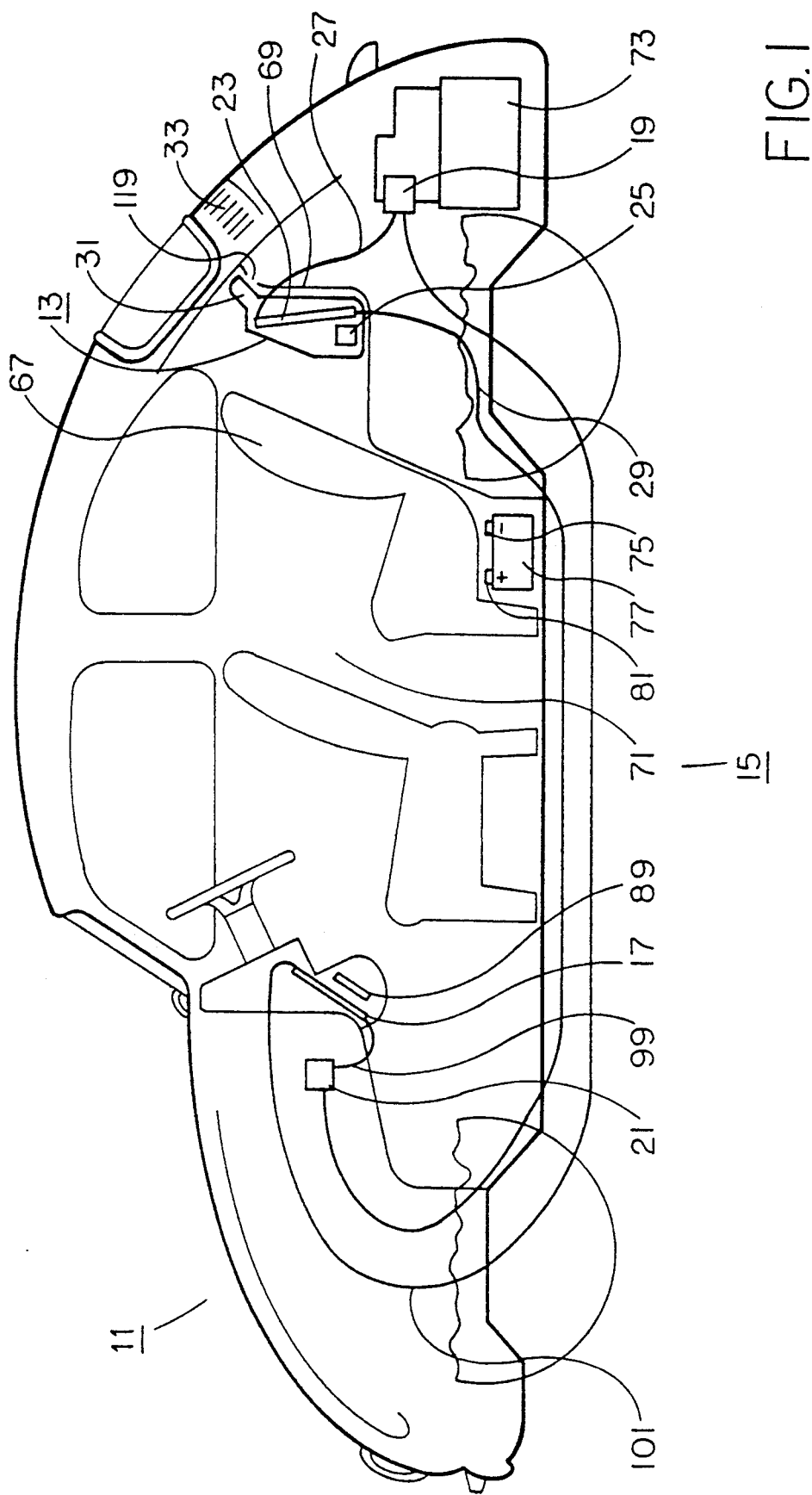
FIG. 1 is a side view of a rear engine automobile incorporating the condenser apparatus of the present invention into the automobile air conditioning system.

In FIG. 1 there is shown a side view of a rear engine automobile 11 incorporating the condenser container 13 of the present invention. The condenser container 13 is integrated into the automobile's air conditioning system 15. The air conditioning system 15 has several components other than the condenser container 13 including an evaporator 17, a compressor 19, and a receiver-drier 21.

Figure 2:
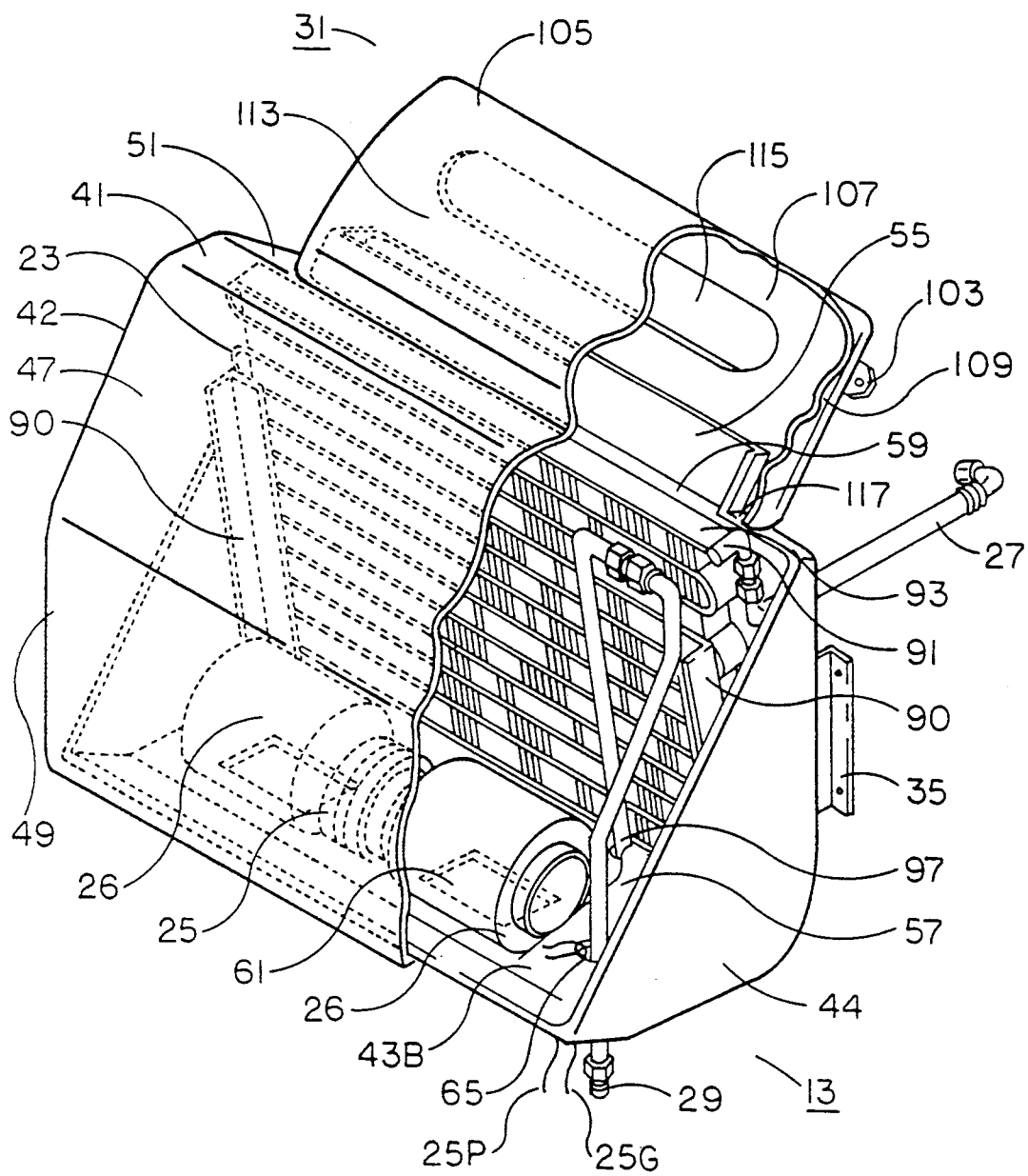
FIG. 2 is a perspective view of the condenser apparatus of the present invention in accordance with the preferred embodiment.
Figure 3:
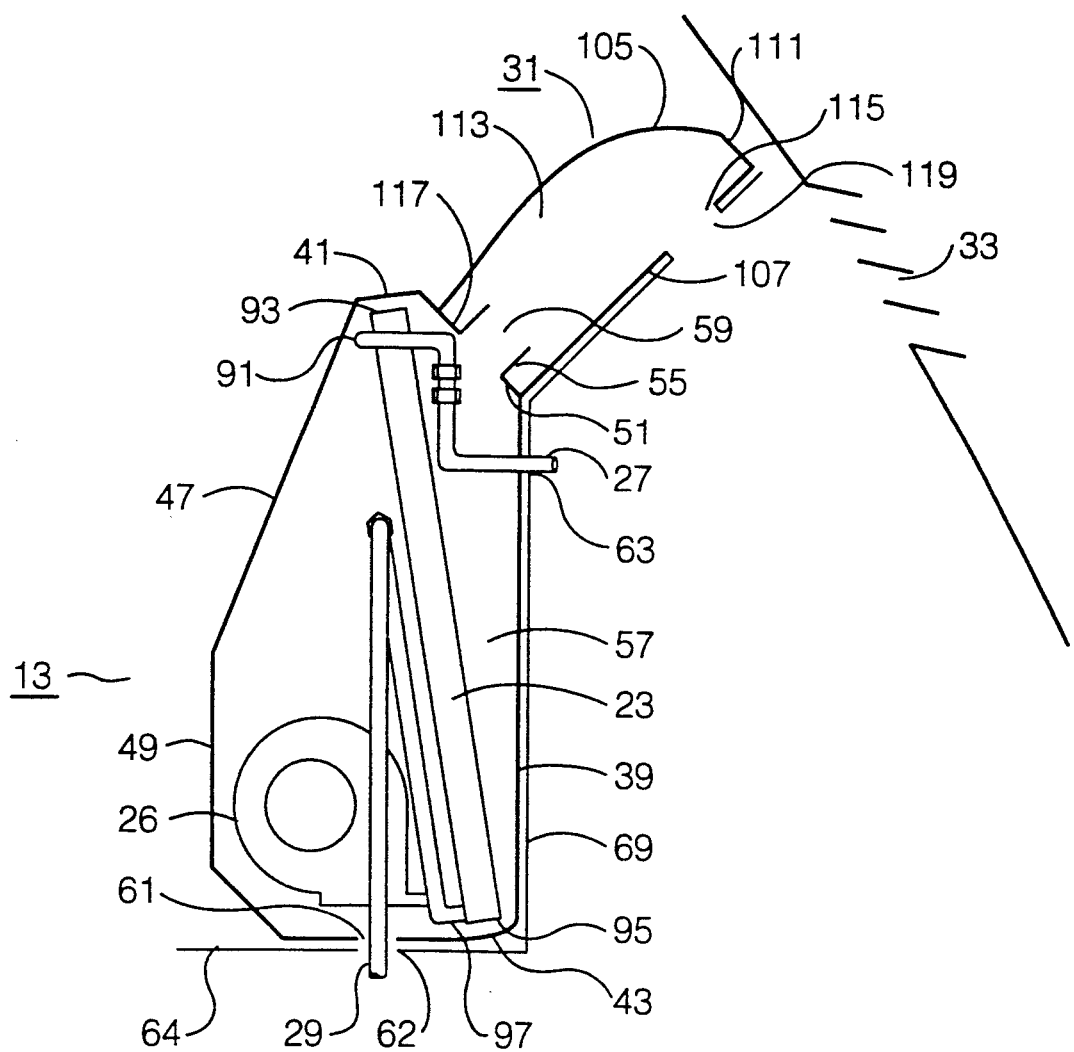
FIG. 3 is a schematic side view of the condenser apparatus of FIG. 2.

The condenser container 13, as shown in FIGS. 2 and 3, has two principal components disposed therein, a condenser coil 23 and dual blowers 25 operated by an electric motor 26. The condenser coil 23 facilitates heat exchange between the air conditioner refrigerant and air from outside the automobile, while the blower 25 draws cool air in from outside the automobile and expels hot air from within the condenser container 13. Refrigerant inlet and outlet conduits 27, 29 extend into the condenser container 13 to couple the condenser coil 23 into the air conditioning system 15. An air intake extension 31 is coupled to the condenser container 13 to allow air to flow into the condenser container 13 from a car vent 33. Mounting brackets 35 enable the condenser container 13 to be mounted in an automobile 11.

Figure 5:
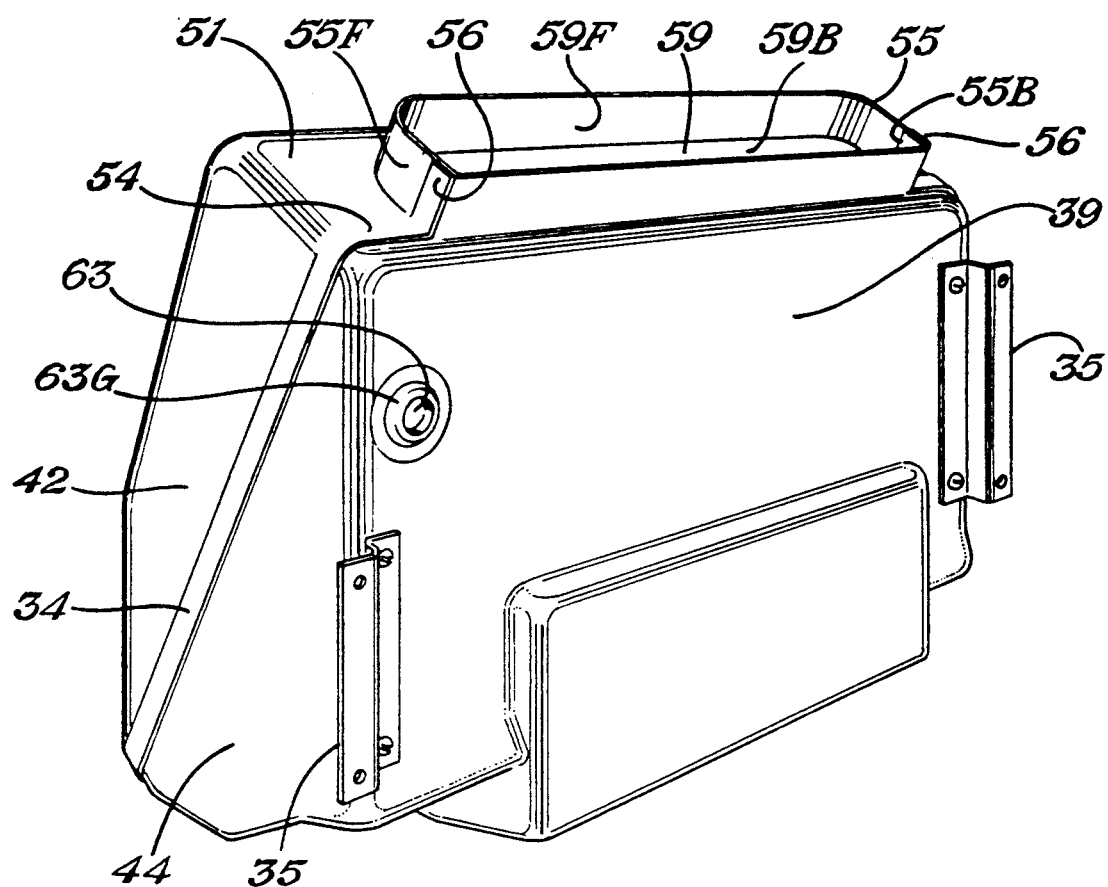
FIG. 5 is an isometric view of the condenser apparatus of FIG. 2 illustrating one side, the back end and top.
Figure 6:
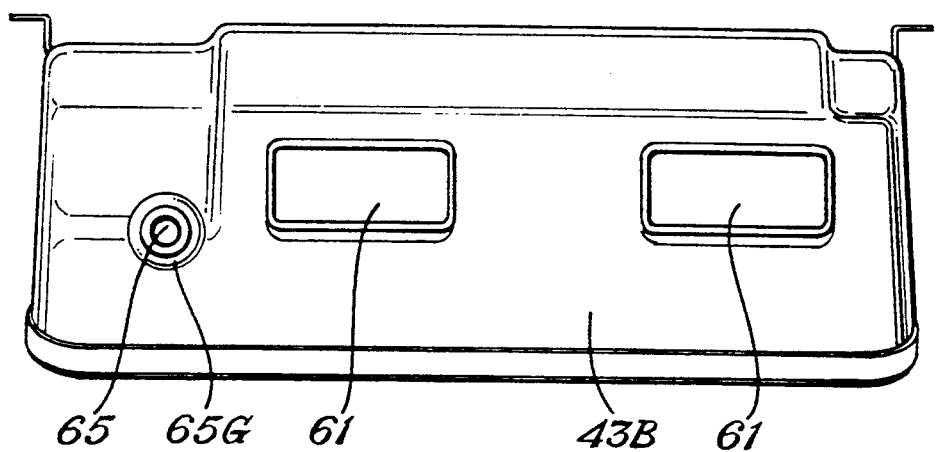
FIG. 6 is a plan view of the bottom of the condenser apparatus.

As seen from FIGS. 5 and 7 the condenser container 13 has a front shell 30 and a back shell 32 which are coupled together to form the condenser container 13. The front shell 30 has a front wall 41, 47, and 49, a top wall 51F, a bottom wall 43F and two side walls 42.

The top wall 51F has an opening 59F with a surrounding U-shaped wall 55F. The two side walls 42 have outward stepped edges 34. The top wall 51F has edges 54 and the wall 55F has outward stepped edges 56.

The back shell 32 has a back wall 39, a top wall 51B, a bottom wall 43B and two side walls 44. The top wall 51B has an opening 59B with a surrounding U-shaped wall 55B. The bottom wall 43B has two outlet openings 61, and a refrigerant outlet opening 65 with a grommet 65G. The back wall 39 has a refrigerant inlet opening 63 with a grommet 63G.

The condenser coil 23, blowers 26, motor 25, and the refrigerant inlet and outlet conduits are secured within the back shell 32.

The two shells 30 and 32 are coupled together by locating the edges of the walls 44, 51B, 55B, and 43B within the edges 34, 54, 56, and 43F respectively such that the edges 34, 54, 56, and 43F overlap the edges of the walls 42, 51B, 55B, and 43B respectively and gluing the overlapped edges together to seal the container 13 so that passenger compartment air is prevented from entering the container through the overlapped edges.

When the two shells 30 and 32 are assembled together, the resulting container 13 has a front wall 41, 47, 49, a top wall 51 formed by walls 51F, 51B, a bottom wall 43F, 43B, a side wall 42, 44, and a side wall 42, 44 forming a cavity 57. The surrounding walls 55F, 55B (forming wall 55) surround an air intake opening 59 defined by opening portions 59F and 59B. The air intake opening 59 allows air to be drawn into the condenser container 13. The two air outlet openings 61 allow the blowers 26 to blow air out of the condenser container 13. The refrigerant inlet opening 63 allows the refrigerant inlet conduit 27 to extend into the container 13 by way of grommet 63G and the refrigerant outlet opening 65 allows the refrigerant outlet conduit to extend out of the container 13 by way of grommet 65G. The electrical leads 25P and 25G of the blower motor 25 extend through the opening 65.

As shown in FIG. 1, the condenser container 13 is designed to fit behind the rear seat 67 of a conventional Volkswagen Beetle. The dimensions of the condenser container 13 are such that the condenser container may be mounted behind the rear seat 67 on the firewall 69 that separates the passenger compartment 71 from the engine 73. The shells 30 and 32 of the condenser container 13 preferably are constructed plastic. The condenser coil 23 and conduits 27 and 29 are formed of suitable metal.

The motor 25 that is located in the condenser container 13 is a conventional D.C. motor for rotating the blowers 26 which may be conventional squirrel cage blowers. The blowers 26 are located directly above the air outlet openings 61 along the bottom wall 43B so that the blowers 26 blow air out the air outlet openings 61, and outside of the vehicle through an opening 62 formed through a wall 64 of the vehicle, and draw air in from the air inlet opening 59 and the cavity 57 of the condenser container 13.

Figure 4:
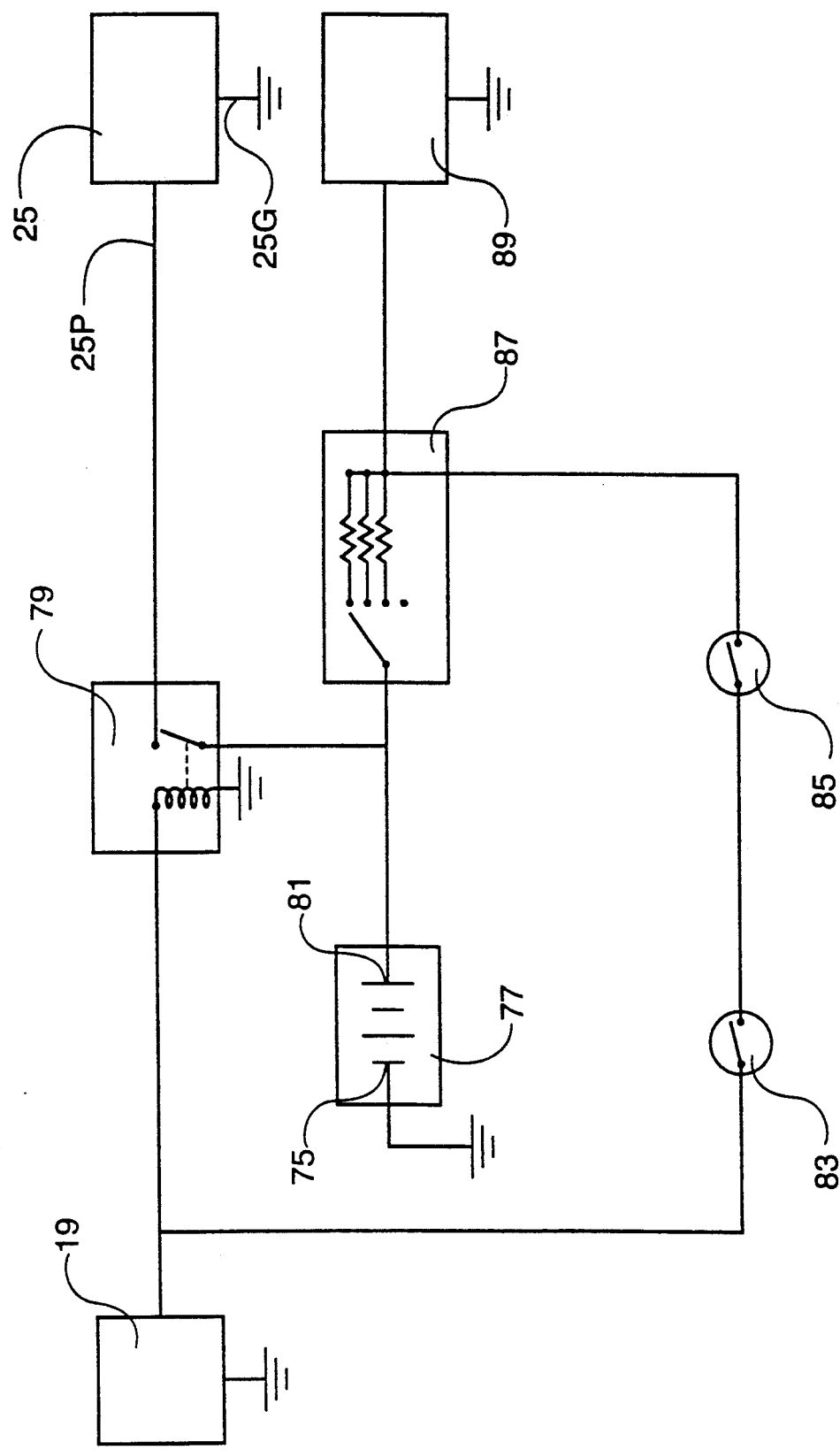
FIG. 4 is a block diagram schematic of the automobile air conditioning electrical system incorporating the condenser apparatus blower of the present invention.

The motor 25 within the condenser container 13 is integrated into the electrical system of the automobile air conditioning system 15. As shown in FIG. 4, the motor 25 and the negative terminal 75 of the battery 77 are grounded. The motor 25 is also connected to a relay 79 which connects the motor 25 to the positive terminal 81 of the battery 77, turning the motor 25 on when current extends through the relay 79. The relay 79 is grounded and is connected to a pressure switch 83 which supplies current to the relay 79 when refrigerant is required in the evaporator 17 and the pressure in the air conditioner system 15 is not too high or too low. Refrigerant is required in the evaporator 17 when the thermostat 85 senses that the temperature in the air conditioning system 15 is too high. The thermostat 85 is connected between the pressure switch 83 and the air conditioner switch 87 which turns the air conditioning system 15 on. The air conditioner switch 87, which is located at the front of the passenger compartment, couples the positive terminal 81 of the battery 77 with the thermostat 85, and with the evaporator fan 89, which is grounded. When the air conditioner switch 87 is turned on, the evaporator fan 89 is turned on, and the motor 25 will turn on if the thermostat 85 and the pressure switch 83 allow current to extend through the relay 79. In FIG. 4, the electrical connection to compressor 19 is to its electromagnetic clutch.

The condenser coil 23 located in the condenser container 13 is a conventional automobile air conditioner condenser coil. As shown in FIGS. 2 and 3, the condenser coil 23 is located between the motor 25 and blowers 26 and the back wall 39, and extends from the bottom wall 43B to the upper wall 41 of the condenser container 13. The condenser coil 23 is held in place within the condenser container 13 by struts 90 that extend upward from the bottom wall 43B along the side walls 44, 42 of the condenser container 13. The condenser coil 23 is placed between the motor 25, and blowers 26, and the air intake opening 59 so that cool air from outside the condenser container 13 is drawn through the spaces between the condenser coil 23 by the blowers 26, which then expel the air warmed by heat exchange with refrigerant in the condenser coil 23 from the condenser container 13. Warm gaseous air conditioner refrigerant enters the condenser coil 23 from the refrigerant inlet conduit 27 through a refrigerant inlet 91 located at the top 93 of the condenser coil 23. Cooled liquid refrigerant leaves the condenser coil 23 at the bottom 95 of the condenser coil 23 through a refrigerant outlet 97 which empties into the refrigerant outlet conduit 29.

As shown in FIG. 1, the condenser coil 23 is integrated into the automobile air conditioning system 15 by coupling the condenser coil 23 with refrigerant inlet and outlet conduits 27, 29. The refrigerant outlet conduit 29 carries cool liquid refrigerant from the condenser coil 23 to the receiver-drier 21. The receiver-drier 21 separates any residual gaseous refrigerant from the liquid refrigerant, as well as stores excess refrigerant. A short refrigerant outlet hose 99 couples the receiver-drier 21 with the evaporator coil 17. The evaporator coil 17 cools the automobile's passenger compartment 71 by a heat exchange process between the passenger compartment air and the liquid refrigerant within the evaporator coil 17 wherein the air is cooled and the refrigerant is heated and evaporated. The evaporator fan 89 blows the cooled air into the passenger compartment 71. The heated gaseous refrigerant exits the evaporator coil 17 through an evaporator-compressor hose 101 and is carried to the compressor 19. The compressor 19 pressurizes the gaseous refrigerant for condensation in the condenser coil 23. The compressor 19 is coupled with the condenser coil 23 by the refrigerant inlet conduit 27. Refrigerant is cycled through the condenser coil 23, the receiver-drier 21, the evaporator coil 17, the compressor 19 and the connecting conduits and 27, 29, 99, 101 when the air conditioning system is being used.

To further aid in cooling the refrigerant, an air intake extension 31 may be coupled to the condenser container 13 to enable the condenser container 13 to reach air from outside the automobile 11. As shown in FIGS. 2, 3, the air intake extension 31 extends between the condenser container 13 and a car vent 33. The air intake extension 31 couples the condenser container 13 around the air intake surrounding wall 55, and is attached to the automobile 11 by air intake extension mounting brackets 103.

The air intake extension has a front upper wall 105, a rear lower wall 107, side walls 109, and an upper rear wall 111. An extension cavity 113 is formed between the walls 105, 107, 109, 111 of the air intake extension 31. A vent access opening 115 extends through the rear lower wall 107 of the air intake extension 31 near the rear upper wall 111 so that air from the car vent 33 may enter the extension cavity 113 through the vent access opening 115. A coupling opening 117 extends into the cavity of the extension 31 and enables the air intake extension 31 to be coupled to the condenser container 13 by receiving the air intake surrounding wall 55F and 55B. The air intake surrounding wall 55F, 55B extends into the extension cavity 113 through the coupling opening 117 so that air from the car vent 33 may flow through the vent access opening 115 and extension cavity 113 of the air intake extension into the air intake opening 59 and thus into the condenser container 13.

The air intake extension 31 has dimensions that allow it to couple the condenser container 13 around the air intake surrounding wall 55F, 55B along the upper wall portion 51 and extend along the firewall 69 of a Volkswagen Beetle. A vent hole 119 must be cut in the firewall 69 to provide the vent access opening 115 access to the car vent 33 of the Volkswagen Beetle. The air intake extension mounting brackets 103 are used to secure the air intake extension 31 to the firewall 69. The air intake extension 31 may be made of plastic.

The condenser container 13 of the current invention is not to be limited by the description of the preferred embodiment of the invention. For example, the condenser container 13 invention may be used in other rear engine automobiles, not just the Volkswagen Beetle.

I claim:

1. An automobile air conditioner condenser apparatus, comprising:
   a container having a an upper wall portion, a bottom wall, a front wall, a back wall, and two side walls, forming a cavity within said walls,
   a condenser coil for receiving a refrigerant, located within said cavity of said container,
   an electric motor and blower means located within the cavity of said container,
   an air inlet opening in said upper wall portion for allowing air to be drawn into said container,
   an air outlet opening in said bottom wall for allowing air to be blown out of said container by said blower means, which in operation draws air into said container through said air inlet opening, against said condenser coil, and blows the air out of said container through said air outlet opening,
   said blower means is located adjacent to said bottom wall of said container within said cavity next to said air outlet opening,
   said condenser coil is located between said motor and blower means and said inlet opening, and
   mounting means for mounting said container in an automobile.

2. The automobile air conditioner condenser apparatus of claim 1, wherein:
   said container is free of a compressor and an evaporator.

3. The automobile air conditioning condenser apparatus of claim 2, further comprising:
   a refrigerant inlet conduit opening formed through said back wall,
   a refrigerant inlet conduit coupled to said condenser coil and extending through said refrigerant inlet conduit opening,
   a refrigerant outlet conduit opening formed through said bottom wall,
   a refrigerant outlet conduit coupled to said condenser coil and extending through said refrigerant outlet conduit opening.

4. The automobile air conditioner condenser apparatus of claim 3, further comprising:
   an air intake extension adapted to be coupled to said container around said air inlet opening, said air intake extension being capable of extending between the container and an air vent in an automobile, wherein said intake extension allows air to flow from said air vent through said air intake extension to said air inlet opening of said container,
   mounting means coupled to said air intake extension for mounting said air intake extension in an automobile.

5. The automobile air conditioner condenser apparatus of claim 3, wherein:
   said container comprises a front shell and a rear shell coupled together,
   said condenser coil, said blower means and said motor being supported by said rear shell.

6. The automobile air conditioner condenser apparatus of claim 3, further comprising:
   an automobile in which said container is located,
   said automobile having an engine and a compressor, said compressor being coupled to said condenser by said refrigerant inlet conduit, an evaporator for evaporating an air conditioner refrigerant, wherein said evaporator is located at the front of said automobile and said evaporator is coupled to said condenser by said refrigerant outlet conduit and said evaporator is coupled to said compressor by an evaporator conduit, an evaporator fan for allowing air cooled by said evaporator to be blown into said passenger compartment of said automobile.

7. The automobile air conditioner condenser apparatus of claim 6, wherein:

said automobile is a rear engine automobile, said container is located and secured between a rear seat and a firewall of said automobile, where said firewall is located behind said rear seat in said automobile and separates said passenger compartment from said engine, said back wall of said container being adjacent to said firewall.

8. An automobile air conditioner condenser apparatus, comprising:

a container having an upper wall portion, a bottom wall, a front wall, a back wall, and two side walls, forming a cavity within said walls, a condenser coil for receiving a refrigerant, located within said cavity of said container, an electric motor and blower means located within the cavity of said container, an air inlet opening in said upper wall portion for allowing air to be drawn into said container, an air outlet opening in said bottom wall for allowing air to be blown out of said container by said blower means, which in operation draws air into said container through said air inlet opening, against said condenser coil, and blows the air out of said container through said air outlet opening, mounting means coupled to said container for mounting said container in an automobile, said container being free of a compressor and an evaporator, a refrigerant inlet conduit opening formed through said back wall, a refrigerant inlet conduit coupled to said condenser coil and extending through said refrigerant inlet conduit opening, a refrigerant outlet conduit opening formed through said bottom wall, a refrigerant outlet conduit coupled to said condenser coil and extending through said refrigerant outlet conduit opening, said blower means is located adjacent to said bottom wall of said container within said cavity next to said air outlet opening, said condenser coil is located between said motor and blower means and said air inlet opening, an air intake extension adapted to be coupled to said container around said air inlet opening, said air intake extension being capable of extending between the container and an air vent in an automobile, where said air intake extension allows air to flow from said air vent through said air intake extension to said air inlet opening of said container, mounting means coupled to said air intake extension for mounting said air intake extension in an automobile, an air inlet surrounding wall extending around said air inlet opening of said container, said air intake extension has a front upper wall, a lower rear wall, side walls, and an upper rear wall, wherein a cavity is disposed between said walls of said air intake extension, a vent access opening extending through said lower rear wall of the air intake extension near said upper rear wall to allow air to enter said cavity in said air intake extension, said air intake extension having a lower opening for receiving said surrounding wall of said container for allowing said motor and blower means to draw air through said vent access opening of said air intake extension into said container through said air inlet opening.

9. The automobile air conditioner condenser apparatus of claim 8, further comprising:

an automobile in which said container is located, said automobile having a rear engine and a compressor, said compressor being coupled to said condenser by said refrigerant inlet conduit, an evaporator for evaporating an air conditioner refrigerant, where said evaporator is located at the front of said automobile and where said evaporator is coupled to said condenser by said refrigerant outlet conduit and said evaporator is coupled to said compressor by an evaporator conduit, an evaporator fan for allowing air cooled by said evaporator to be blown into said passenger compartment of said automobile, said container is located and secured between a rear seat and a firewall of said automobile, where said firewall is located behind said rear seat in said automobile and separates said passenger compartment from said engine, said lower portion of said back wall of said container being adjacent to said firewall, said air intake extension is located and secured between said rear seat and said firewall, where a portion of said firewall is adjacent to an air vent in said automobile, and said air intake extension is coupled to said firewall so that said air intake extension is adjacent to said air vent.

10. An automobile air conditioner condenser apparatus, comprising:

a container having an upper wall portion, a bottom wall, a front wall, a back wall, and two side walls, forming a cavity within said walls, a condenser coil for receiving a refrigerant, located within said cavity of said container, an electric motor and blower means located within the cavity of said container, an air inlet opening in said upper wall portion for allowing air to be drawn into said container, an air outlet opening in said bottom wall for allowing air to be blown out of said container by said blower means, which in operation draws air into said container through said air inlet opening, against said condenser coil, and blows the air out of said container through said air outlet opening, an air inlet surrounding wall extending around said air inlet opening of said container, mounting means for mounting said container in an automobile, an air intake extension adapted to be coupled to said inlet surrounding wall of said container around said air inlet opening, said air intake extension being capable of extending between the container and an air vent in an automobile, wherein said air intake extension allows air to flow from said air vent through said air intake extension to said air inlet opening of said container, said air intake extension having a front upper wall, a lower rear wall, side walls, and an upper rear wall, wherein a cavity is disposed between said walls of said air intake extension, a vent access opening extending through said lower rear wall of the air intake extension near said upper rear wall to allow air to enter said cavity in said air intake extension, said air intake extension having a lower opening for receiving said surrounding wall of said container for allowing said motor and blower means to draw air through said vent access opening of said air intake extension into said container through said air inlet opening, and mounting means for mounting said air intake extension in an automobile.

11. The automobile air conditioner condenser apparatus of claim 10, wherein:

said blower means is located adjacent to said bottom wall of said container within said cavity next to said outlet opening, said condenser coil is located between said motor and blower means and said inlet opening.

* * * * *